(12) United States Patent
Schilling et al.

(10) Patent No.: US 6,974,218 B2
(45) Date of Patent: Dec. 13, 2005

(54) RETROFLECTOR (75) Inventors: Andreas Schilling, Hagendorn (CH); Wayne Robert Tompkin, Baden (CH)

(73) Assignee: OVD Kinegram AG, Zug (CH)

( * ) Notice: Subject to any disclaimer, the term of this patent is extended or adjusted under 35 U.S.C. 154(b) by 139 days.

(21) Appl. No.: 10/797,788

(22) Filed: Mar. 10, 2004

(65) Prior Publication Data
US 2004/0184151 A1  Sep. 23, 2004

(30) Foreign Application Priority Data
Mar. 21, 2003  (DE) ................ 103 12 708

(51) Int. Cl.[7] .............................................. G02B 5/122
(52) U.S. Cl. .................. 359/529; 359/530; 359/572; 359/569
(58) Field of Search ................. 359/529, 530, 359/566, 569, 570, 572

(56) References Cited

U.S. PATENT DOCUMENTS

| | | | |
|---|---|---|---|
| 1,671,086 A | 5/1928 | Stimson | |
| 3,712,706 A | 1/1973 | Stamm | |
| 4,568,141 A | 2/1986 | Antes | |
| 4,588,258 A | 5/1986 | Hoopman | |
| 4,856,857 A | 8/1989 | Takeuchi et al. | |
| 4,938,563 A | 7/1990 | Nelson et al. | |
| 6,043,936 A | 3/2000 | Large | |
| 2005/0068625 A1 * | 3/2005 | Schilling et al. | |

FOREIGN PATENT DOCUMENTS

| | | |
|---|---|---|
| DE | 44 21 407 C1 | 6/1995 |
| DE | 44 29 683 C1 | 3/1996 |
| DE | 696 19 691 T2 | 8/2002 |
| DE | 10127979 C1 | 11/2002 |
| DE | 101 27 981 C1 | 1/2003 |
| DE | 101 29 938 A1 | 1/2003 |
| EP | 0 303 355 A2 | 2/1989 |
| EP | 0 375 833 A1 | 7/1990 |
| WO | WO 99/47983 | 9/1999 |
| WO | WO 00/43813 A1 | 7/2000 |
| WO | WO 02/057816 A1 | 7/2002 |

OTHER PUBLICATIONS

"Diffractive Optical Code for IC-Card Security," Tompkin, et al., *Optical Security and Counterfeit Deterrence Techniques II*, vol. 3973 (2000).

* cited by examiner

Primary Examiner—James Phan
(74) Attorney, Agent, or Firm—Hoffmann & Baron, LLP (57) ABSTRACT

A layer composite of plastic material forms a retroreflector and includes at least one transparent structure layer, a protective layer and a reflection layer enclosed at the common interface between the structure layer and the protection layer. A relief structure formed by substantially identically shaped three-dimensional structure elements is formed in the reflection layer. At their base surfaces the structure elements are of lateral dimensions in the range of between 1 $\mu$m and 100 $\mu$m. The structure elements have side faces which are covered by the reflection layer and which include an angle of inclination of 45°, with a free surface of the layer composite. The relief structure is additively superimposed with a microstructure in at least one surface element. The microstructure has a preferred direction and influences the quality of the reflection action of the layer composite. The retroreflector is suitable for the production of machine-readable optical markings.

21 Claims, 3 Drawing Sheets

RETROFLECTOR

CROSS-REFERENCES TO RELATED APPLICATIONS

This application claims the priority of German patent application Ser. No. 103 12 708.9 filed Mar. 21, 2003, the subject-matter of which is incorporated herein by reference.

FIELD OF THE INVENTION

The present invention generally concerns a retroreflector.

BACKGROUND OF THE INVENTION

Retroreflectors are used as reflective devices for marking articles and persons, the surface or clothing respectively of which greatly absorbs light and is therefore difficult to see in the dark, for example at night, even when strong lighting is involved. The retroreflectors are provided with reflective surfaces which are enclosed in a layer composite and are applied by means of adhesive for example to predetermined surfaces. In that way retroreflectors enhance the visibility of for example building barriers, optical markings, bicycles, motor vehicles and so forth.

Reference is made in this respect to U.S. Pat. No. 3,712,706 disclosing a retroreflector in which a relief structure is composed of reflective tetrahedron elements in the form of corner cubes. Production of the relief structure with the periodically arranged tetrahedron elements is effected by cutting three sets of parallel, V-shaped grooves into the surface of a metal master plate, by means of a diamond tool. The three sets with the parallel, V-shaped grooves intersect at predetermined angles in such a way that the surface of the metal master plate has the relief structure formed from the periodically arranged tetrahedron elements. Retroreflectors of that kind reflect incident light in a narrow spatial angle centered around the direction of the incident light. An increase in the angle of the reflected light is effected by diffraction of the light at the relief structure.

WO 00/43813 describes a retroreflector which in substance corresponds to U.S. Pat. No. 3,712,706 as just discussed above. Chips or small portions of such retroreflectors can be added as a pigment to a lacquer. An article which is coated with such a lacquer has a strongly reflective surface.

U.S. Pat. No. 1,671,086 provides the teaching of not excessively polishing the reflective surfaces of the retroreflector with the typical cube edge, so that the reflected light can be scattered at the minor irregularities in the reflective surfaces of the retroreflector. The parallel light beam which is incident on the retroreflector is reflected and is returned in a cone with the incident light beam as the axis in a symmetrical condition in expanding relationship back to the light source.

Attention may be directed here to DE 44 29 683 C1 describing a triple reflector which is a body formed from structure elements, each of which is of a shape delimited by three reflective square faces. The three faces form a surface which corresponds to the cube surface which is visible in the direction of the cube diagonals. The three faces of each structure element can be slightly curved inwardly in the manner of a hollow mirror and may have a grooving so that the triple reflector reflects the incident parallel light beam back to the light source in divergent relationship.

Reference may also be made to U.S. Pat. No. 4,588,258 and U.S. Pat. No. 4,938,563 in which shaping the relief structure of a retroreflector in a flexible film material, by virtue of the small thickness of material involved, necessarily results in microscopically small lateral dimensions of the elements of the relief structure and consequently affords strong light diffraction effects. Minor asymmetries in the relief structure, which incline the axes of the tetrahedron elements through a few degrees of angle out of the normal direction, reduce the scatter of the reflected light. U.S. Pat. No. 4,938,563 more specifically refers to the possibility of influencing divergence or scatter of the reflected light by suitably arranging the tetrahedron elements, of differing asymmetrical nature, within the relief structure.

DE 696 19 691 T2 provides that the retroreflectors can be improved by a diffraction structure which is superimposed on the relief structure and which imparts to the reflected light a color which is dependent on the spatial frequency of the diffraction structure, without the use of colored pigments.

A summary of materials which are suitable for the production of layer composite material for retroreflectors is to be found in U.S. Pat. No. 4,856,857.

It will be appreciated that retroreflectors are readily commercially available. An aspect in common to such retroreflectors is that it is not possible to derive any conclusions about the orientation of the retroreflector from the reflected light.

SUMMARY OF THE INVENTION

An object of the present invention is to provide an inexpensive and efficient retroreflector involving novel structures which afford a predetermined modification in the light reflected by the retroreflector.

Another object of the present invention is to provide a retroreflector constituted by a layer composite of a specifically designed configuration to provide enhanced retroreflection.

Still another object of the present invention is to provide a retroreflector comprising a layer composite involving specifically selected materials and material parameters to afford a rationally implemented retroreflection effect.

In accordance with the principles of the present invention the foregoing and other objects are attained by a retroreflector comprising a plastic layer composite including at least one transparent structure layer, a protective layer, and a reflection layer enclosed at a common interface between the structure layer and the protective layer. The reflection layer has a relief structure which is formed by substantially identically shaped three-dimensional structure elements and the base surfaces of which are of lateral dimensions in the range of between 1 $\mu$m and 200 $\mu$m and whose side surfaces which are covered with the reflection layer include an angle of inclination of 45° relative to a free surface of the layer composite. The relief structure is superimposed in at least one surface portion or element with a microstructure distinguished by a preferred direction and for influencing the quality of the reflection action of the layer composite the microstructure in each surface portion or element has a single preferred direction.

Preferred and advantageous features of the present invention are set forth in subsequent claims.

Further objects, features and advantages of the invention will be apparent from the description hereinafter of preferred configurations of the invention.

DESCRIPTION OF PREFERRED EMBODIMENTS

Figure 1:
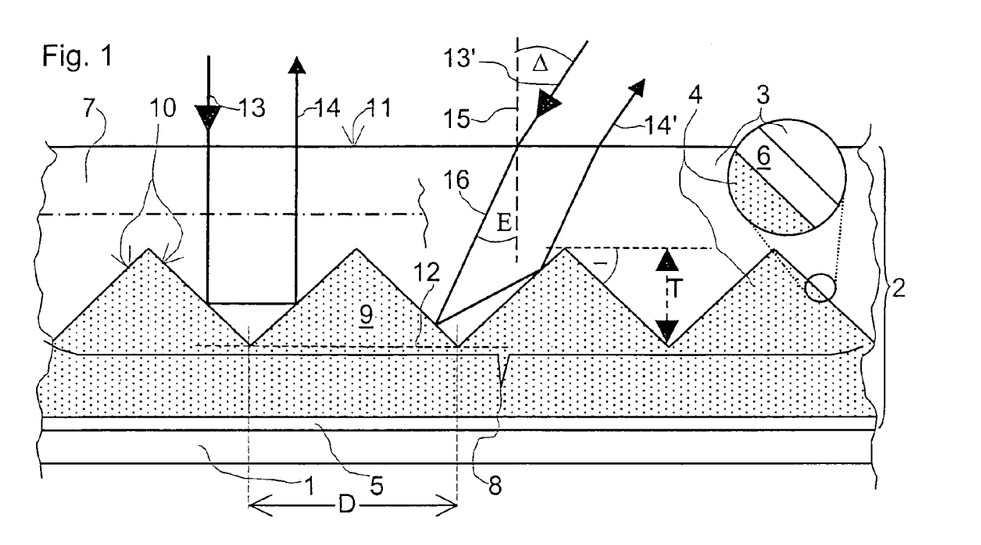
FIG. 1 is a view in cross-section of a retroreflector according to the invention.

Reference will first be made to FIG. 1 in which reference 1 denotes a substrate, reference 2 denotes a layer composite, reference 3 a transparent structure layer, reference 4 a protective layer, reference 5 an adhesive layer and reference 6 a reflection layer. At least the structure layer 3, the reflection layer 6 and the protective layer 4, in the specified sequence, form the layer composite 3, while the substrate 1 is for example a removable backing or support strip for protecting the adhesive layer 5 which is possibly applied to the surface of the protective layer 4, that is remote from the structure layer 3, or alternatively it may be an article which is joined to the layer composite 2 by means of the adhesive layer 5 and to which the layer composite 2 is applied. In an embodiment of the layer composite 2 a tough, transparent base film 7 extends over the structure layer 3 and thus forms a further layer of the layer composite 2, as indicated in FIG. 1. In another alternative configuration the base film 7 can be a laminating film which is secured by adhesive over the article in such a way that the layer composite 3 is accordingly enclosed between the article and the laminating foil.

The reflection layer 6 has a high level of reflectivity achieved by a metal layer applied for example by vapor deposition to the structured side of the structure layer 3. In that respect, aluminum, silver, chromium, gold, copper, tellurium and similar materials, as set forth for example in Table 5 of U.S. Pat. No. 4,856,857 to which reference is accordingly directed for incorporation of that disclosure herein, and possibly alloys of such metals may be mentioned as substances providing for good reflectivity with layer thicknesses in a range of between 10 nm and 150 nm. In a specific configuration of the layer composite 2 the reflection layer 6 may comprise one of the inorganic transparent materials set forth in Tables 1, 3 and 4 of above-mentioned U.S. Pat. No. 4,856,857, or one of the transparent chalcogenides known from above-mentioned WO 99/47983. Preferably materials such as $TiO_2$, $ZnS$, $SiO_2$ and so forth are used. Instead of a uniform layer, variants of the reflection layer 6 involve a thin film system. Examples in that respect are multi-layer systems comprising the above-mentioned inorganic dielectrics or combinations of metallic and dielectric layers. An embodiment of the layer composite 2 with a transparent reflection layer 6 advantageously only consists of transparent materials so that a sign or signal marking which is under the layer composite 2 is visible.

The interface between the structure layer 3 and the protective layer 4 has a relief structure 8 which is superimposed with a fine structure and which was shaped prior to application of the protective layer 4, in the structure layer 3. The relief structure 8 comprises structure portions or elements 9. The structure elements 9 have side faces 19 which face towards the structure layer 3 and which are covered by the reflection layer 6. The base surfaces of the structure elements 9 form a base plane 12 which is arranged in parallel relationship with the surface 11 of the protective layer 4. For reasons relating to clarity and ease of comprehension of the drawing, in FIG. 1 one of the structure elements 9 is delimited by means of a broken line indicating the position of the base plane referenced 12.

The relief structure 8 is preferably of a structure depth as indicated at T of between 0.25 $\mu$m and 100 $\mu$m. The spatial frequency of the relief structure 8, in comparison with that of the fine structure superimposed thereon, is low, in which respect the structure elements 9, in the base plane 12, involve a lateral dimension as indicated by D in a range of between 0.5 $\mu$m and 200 $\mu$m. The preferred values of D are in a range of between D=1 $\mu$m and D=50 $\mu$m. The dimension D and the structure depth T are to be so selected that the side faces 10 which are covered by the reflection layer 6 are inclined with respect to the base plane 12 and include an angle of inclination θ of 45° with respect to the base plane 12. In other words, the dimension D is double the depth T, or D=2·T. In a possible design configuration of the relief structure 8 the structure elements 9 are identical.

The above-mentioned base film 7 possibly protects the layer composite 2 from damage under the effect of mechanical forces acting thereon from the exterior. The base film 7 is arranged on the side of the structure layer 3, that is remote from the relief structure 8, and is fixedly joined to the structure layer 3. Base films of suitable materials such as polyethylene terephthalate, polycarbonate, polypropylene and so forth are highly transparent and resistant to abrasion and tensile forces. They already effectively protect the layer composite 2, when the thickness of the base film 7 is about 10 $\mu$m. At the left in FIG. 1 the base film 7 is indicated by a dash-dotted line. In this configuration the exposed surface 11 is the side of the base film 7, that is remote from the main body part of the layer composite 2.

Suitable materials for the structure layer 3 and the protective layer 4 of the layer composite 2 are for example polymethylmethacrylate-based lacquers. UV-lacquers are advantageous for the structure layer 3, specifically for relief structures 8 involving large structure depths T. Radiation-hardening lacquers, for example UV-lacquers, harden under the effect of suitable radiation, for example upon being irradiated with ultraviolet light. In that case, during the hardening process, the relief structure 8 is formed in the UV-lacquer, while it is still of a kneadable or pasty nature, of the structure layer 3. Reference may be made to above-mentioned U.S. Pat. No. 4,856,857 for the compositions of such lacquers, the disclosure thereof being hereby incorporated by reference. A cold adhesive or a hot melt adhesive may be suitably used for the adhesive layer 5. Reference may also be made in this respect to U.S. Pat. No. 4,856,857 for suitable adhesive materials.

Light as indicated at 13 and 13' which is incident through the surface 11 is reflected in the layer composite 2 at the reflection layer 6. Because of the angle of inclination θ of 45°, reflected light beams indicated at 14, 14' leave the layer composite 2 again only after double reflection in parallel relationship with the direction of the incident light 13, 13'. That applies in regard to a wide range of values of an angle of incidence α which is measured between the direction of the incident light 13, 13' and a normal 15 on to the free surface 11 of the layer composite 2. The values for the angle of incidence α are in a range of between 0° and about 75° and thus embrace practically the entire half-space over the layer composite 2. As the transparent plastic materials of the structure layer 3 usually involve a refractive index of about n=1.5, the incident light beams 13' are deflected towards the normal 15 as refracted light beams 16, because of the refraction effect. Within the layer composite 2 the effective angle of incidence β between the refracted light beams 16 and the normal 15 is at most 45°. As the incident light 13, 13', irrespective of the angle of incidence α, is always reflected in the direction from which the incident light 13, 13' comes, corresponding layer composites 2 are known by the term retroreflector.

In an embodiment of the layer composite 2 the structure elements 9 involve small lateral dimensions in the range of some 10 micrometers or less. Therefore, unwanted diffraction effects occur at the structure elements 9, particularly when lighting using coherent light is involved. Advantageously, to suppress such unwanted diffraction effects, the structure elements 9 involving small lateral dimensions are no longer arranged exactly periodically on the base plane 12, but involve a quasi-random distribution on the base plane 12. Small reflective flat surface portions of the base plane 12 can be present between the adjacent structure elements 9 and/or respectively adjacent structure elements 9 can move close together. The small proportion of volume of the structure shape, which is jointly occupied by the closely adjacently disposed structure elements 9, is of practically the same three-dimensional shape as the original structure elements 9. The relief structure 8 is therefore composed of substantially identical structure elements 9.

In another configuration, the local values in respect of the structure depth may be dispersed randomly around a mean value in respect of the structure depth T so that the unwanted diffraction effects at the structure elements 9 are also thereby suppressed. Those measures for reducing the unwanted diffraction effects can also be combined with each other.

Figure 2:
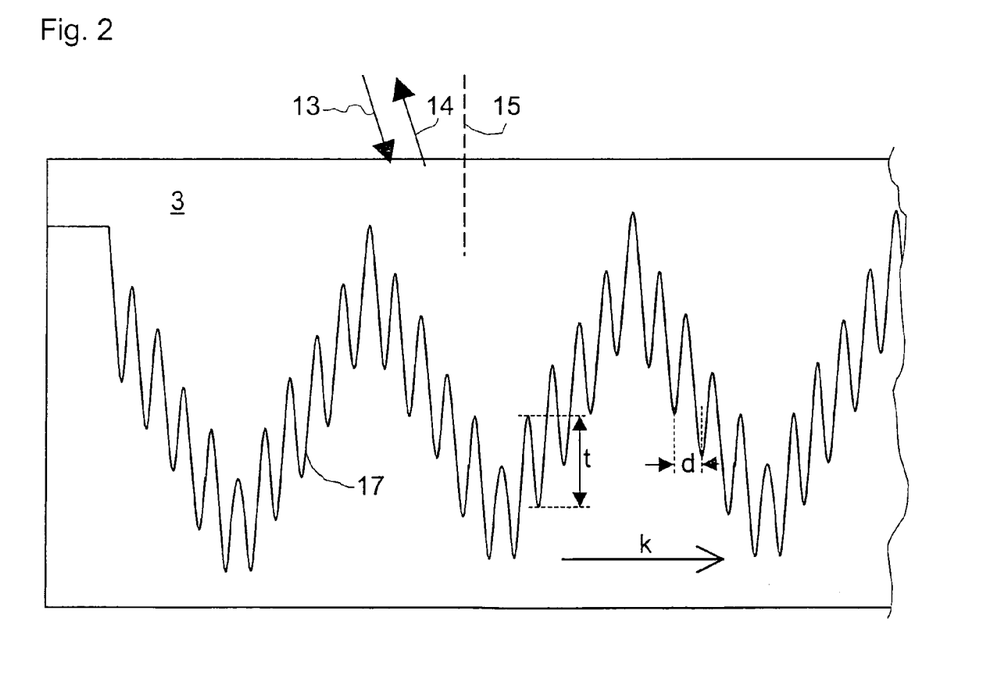
FIG. 2 is a view on an enlarged scale of a portion of a relief structure from the FIG. 1 retroreflector.

Reference will now be made to FIG. 2 showing an enlarged view which is not true to scale of the cross-section through the layer composite 2 indicated in FIG. 1, with the relief structure 8 indicated in broken line. The side faces indicated at 10 in FIG. 1, which are covered by the reflection layer indicated at 6 in FIG. 1, form an interface between the structure layer 3 and the protective layer 4. The side faces 10 are not smooth but have a light-modifying fine structure to which reference has already been made hereinbefore. The fine structure which is for example additively, multiplicatively and so forth superimposed on the relief structure 8 is a microscopically fine microstructure 17 which influences the quality of the reflection action of the layer composite 2. The reflected light beams indicated at 14, 14' in FIG. 1 are modified by the reflection action of the microstructure 17, for example in respect of color, polarisation, divergence and so forth.

Referring to FIG. 2, the microstructure 17 illustrated therein is for example a linear diffraction grating with a sinusoidal profile. The diffraction grating can be characterised for example by a grating vector, a grating period, which can also be referred to as the line spacing, as indicated at d of less than 500 nm, and an optically effective fine structure depth t of between 20 nm and 1000 nm. The geometrical fine structure depth $t_G$ which is to be shaped in the arrangement, in accordance with the refractive index n of the structure layer 3 filling the microstructure 17, is less, that is to say $t_G$=t/n. The refractive index n of the structure layer 3 is typically in a range of between n=1.5 and 1.6. The reference to the fine structure depth t hereinafter is always intended to denote the optically effective depth. The grating vector, the preferred direction k, of the diffraction grating is in the plane of the drawing in FIG. 2.

Besides the sinusoidal profile involved here, other sine-like or rectangular profiles are also appropriate for the periodic, linear diffraction grating or cross grating which forms the microstructure 17.

Microstructures 17 whose diffraction gratings are of a value in respect of the grating period d of less than 350 nm are particularly advantageous for superimposition on the relief structure 8. Those diffraction gratings also diffract visible incident light 13 which impinges inclinedly on the side faces 10 only into the zero diffraction order, that is to say they reflect like a mirror, and therefore have no influence on the direction of the reflected light beams 14. In dependence on the grating period d the diffraction grating can suppress individual ranges in the visible spectrum of the incident light 13 so that the diffracted reflected light beams 14 are of a mixed color, that is to say the diffraction gratings act like flat colored mirrors.

Advantageously, the diffraction grating with the grating period d<350 nm has a metallic layer 6 which is a good reflector and which comprises a suitable material such as silver, aluminum, gold or the like, or an alloy with one of those metals as its main component. The value of the fine structure depth t is desirably selected from a range of between 50 nm and 250 nm. In that range in respect of the fine structure depth t the diffraction grating acts as an effective polariser or as an analyser for polarisedly incident light 13. In that range in respect of the fine structure depth t, the TE polarised light is diffracted with a high level of efficiency practically independently of the fine structure depth t. In contrast thereto, the level of diffraction efficiency for the TM polarised light is heavily dependent on the fine structure t, while the diffraction efficiency for the TM polarised light rapidly falls to a first minimum, with an increasing fine structure depth t. The maximum level of polarisation efficiency is therefore in the range of the fine structure depth t of the first minimum for the diffraction efficiency of TM polarised light. The direction of the unpolarisedly incident light 13 and the normal 15 establish a diffraction plane, being here the plane of the drawing in FIG. 2. If the preferred direction k of the diffraction grating is in the diffraction plane, then the electrical field vector of the p-polarised light oscillates parallel to that plane as TE polarised light and is reflected by the diffraction grating with a high level of diffraction efficiency. The electrical field vector of the s-polarised light which oscillates perpendicularly to the diffraction plane is diffracted as TM polarised light with a low level of diffraction efficiency, that is to say it is practically absorbed. The diffracted reflected light beams 14 are therefore linearly polarised, in other words, the diffraction grating of the microstructure 17 acts as a polariser or, for the polarisedly incident light 13, as an analyser.

In a possible embodiment, the diffraction grating involves a grating period d=300 nm, a sinusoidal profile and a reflection layer 6 which comprises aluminum. The maximum level of polarisation efficiency or the minimum degree of diffraction efficiency for the TM polarised light is in the preferred range of the fine structure depth of between t=100 nm and t= 150 nm for light beams indicated at 16 in FIG. 1, which are incident on the diffraction grating at the effective angle of incidence β<|45°| and which are of wavelengths in the region of 550 nm.

If the diffraction grating is turned through 90° about the normal 15, so that the preferred direction k is oriented perpendicularly to the plane of the drawing in FIG. 2, the p-polarised light is absorbed and s-polarised light diffracted by the diffraction grating, always with respect to the diffraction plane.

The advantage of the polarisation capability of the retroreflector according to the invention is that, on the basis of polarisation of the light beams 14 backscattered by the retroreflector, the orientation of the retroreflector or the preferred direction k of the microstructure 17 can be established from a great distance.

Figure 3:
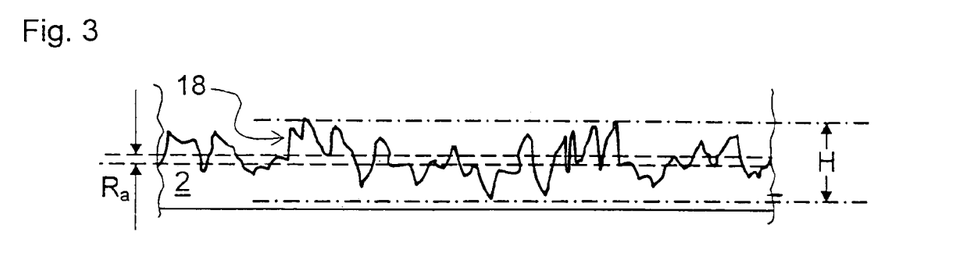
FIG. 3 shows a matt structure.

Reference is now directed to FIG. 3 showing a matt structure 18 which can be used as a microstructure as indicated 17 in FIG. 2. Microscopically fine relief structures are randomly distributed in the matt structure 18, and for that reason the matt structure 18 can only be described by statistical characteristic parameters such as for example mean roughness value $R_a$, correlation length $l_c$ and so forth. The microscopically fine relief structure elements of the matt structure 18 determine the scatter capability. The parameter consisting of the mean roughness value $R_a$ is in the range of between 20 nm and 5000 nm, with preferred values of between 50 nm and 1000 nm, and corresponds to the optically effective fine structure depth t of the diffraction grating. The greatest differences in height as indicated by H within the matt structure 18 amount to a multiple of the mean roughness value $R_a$. The parameter of the correlation length $l_c$, at least in one direction, is of values in the range of between 200 nm and 50,000 nm, preferably between 500 nm and 10,000 nm. If the microscopically fine relief structure elements do not have any azimuthal preferred direction, that arrangement then involves what is referred to as an isotropic matt structure 18. The light 13 which is incident on the isotropic matt structure 18 is reflected in a spatial angle which is predetermined by the scatter capability of the matt structure 18 and which is centered around the axis of the incident light 13. The level of intensity of the scattered light uniformly decreases in all directions from the axis of the spatial angle. The spread of that angle is determined by an intensity limit value which is predetermined by visual or machine readability. Severely scattering matt structures 18 distribute the scattered light in a larger spatial angle than a weakly scattering matt structure 18. If the microscopically fine relief structure elements are on average azimuthally oriented on to a preferred direction k, the matt structure 18 provides for anisotropic scattering of the incident light, in which respect the predetermined spatial angle of the matt structure 18 is of a cross-sectional configuration in the form of an ellipse, the larger or main axis of which is perpendicular to the preferred direction k of the relief structure elements. In contrast to the diffractive structures the matt structures 18 scatter the incident light 13 practically independently of the wavelength thereof.

The design configuration of the retroreflector in which the microstructure 17 superimposed on the relief structure 18 is one of the matt structures 18 advantageously involves an increased divergence, which is determined by the scatter capability, in respect of the light beams as indicated at 14 in FIG. 2, which are backscattered from the retroreflector. In addition, the level of light intensity in the spatial angle of the backscattered light beams 14 is averaged out and any diffraction effects occurring are suppressed. Those properties are particularly advantageous if the incident light indicated at 13 in FIG. 2 is of one color or if the retroreflector is used for road markings or traffic signs.

Figure 4:
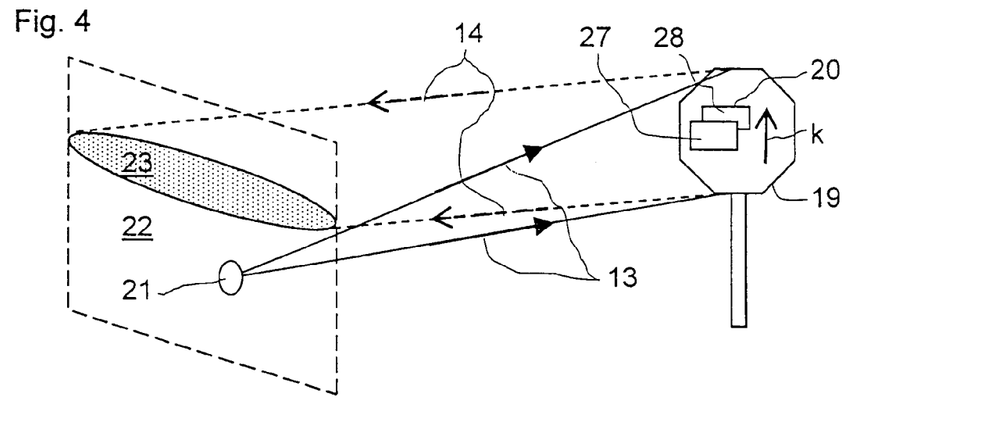
FIG. 4 shows a sign with retroreflectors.

Attention is now directed to FIG. 4 showing a retroreflector according to the invention disposed on the front side of a traffic or road sign. For superimposition in respect of the relief structure indicated at 8 for example in FIG. 1, the retroreflector advantageously has surface portions or elements 27, 28 with anisotropic matt structures as indicated at 18 in FIG. 3 as the microstructure indicated at 17 in FIG. 2. The preferred direction k thereof is oriented vertically in the image pattern 20, for example of a traffic signal 19, a corporation plaque or the like, the pattern 20 being formed by the surface elements 27, 28.

The material of the structure layer referenced 3 in FIG. 1 and/or the base foil referenced 7 in FIG. 1 acts as a color filter and is transparent. The color filter of the surface elements 27, 28 is selected according to the colors for the image pattern 20 of the traffic sign 19. The incident light 13 produced by a light source indicated at 21 in FIG. 4, for example a vehicle headlamp, is reflected by the retroreflector in the spatial angle which is predetermined by the matt structure 18. The intensity of the reflected light beams 14 is concentrated in a horizontal ellipse 23 which, in a notional plane 22 disposed at the location of the light source and in perpendicular relationship to the reflected light beams 14, shows the cross-section of the spatial angle of the reflected light beams 14. For road users, such traffic signs 19 afford optimum visibility in the dark, in the light 13 of their light sources 21.

In another possible embodiment of the layer composite indicated at 2 in FIG. 1 the microstructure 17 superimposed on the relief structure 8 is a superimposition comprising a periodic diffraction grating and one of the matt structures 18. That configuration of the retroreflector affords the advantage that it combines both the polarisation capability of the diffraction grating and also the advantages of the above-described matt structures. The scatter capability of the matt structure 18 influences polarisation of the backscattered light beams 14 not at all or only very slightly.

Figure 5A:
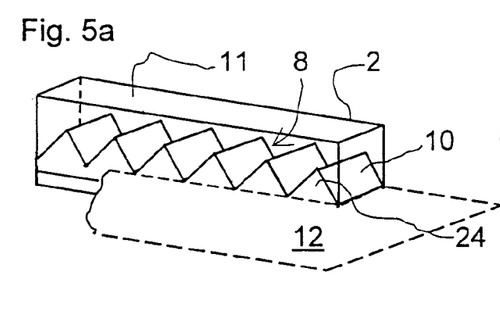
FIG. 5a shows a simple grating structure of the retroreflector.
Figure 5B:
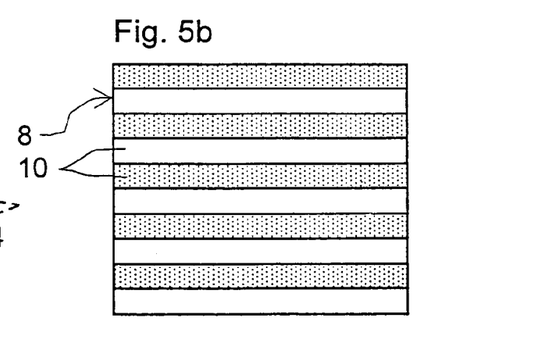
FIG. 5b shows a plan view of the FIG. 5a grating structure.

Referring now to FIG. 5a, shown therein is a portion of the layer composite 2 with a simple configuration of the relief structure 8, in the form of a linear grating. The grating here involves a symmetrical sawtooth profile, the grooves of which are of a V-shaped configuration, with the mutually perpendicularly arranged side walls 10. The microstructure indicated at 17 in FIG. 2 is too fine to be visible in FIG. 5a. FIG. 5b shows a plan view of the relief structure 8. The side faces 10 which are marked by a dot pattern are the side faces which are not shown in FIG. 5a. The structure elements referenced 9 in FIG. 1 are prisms with an isosceles, right-angled triangle as the end cover face 24. The prisms lie with their hypotenuse face on the notional base plane 12 which is oriented in parallel relationship with the surface 11 of the layer composite 2.

Figure 6A:
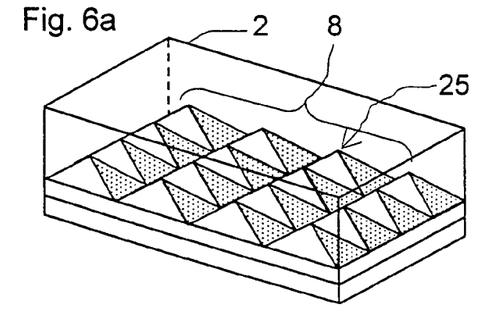
FIG. 6a shows a retroreflector with a pyramid structure.
Figure 6B:
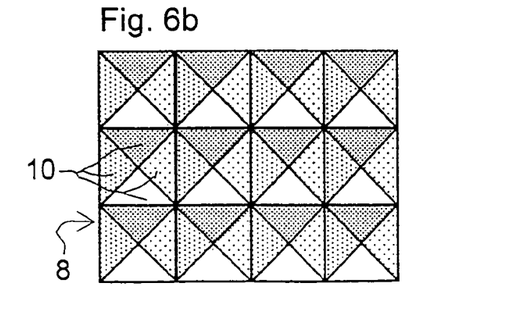
FIG. 6b shows a plan view of the FIG. 6a pyramid structure.

Reference is now made to FIG. 6a showing another possible embodiment of the relief structure 8 in the layer composite 2. Once again the microstructure shown at 17 in FIG. 2 is not illustrated here. The relief structure 8 is a superimposition of at last two linear gratings forming a cross grating arrangement. The linear gratings have the above-described symmetrical sawtooth profile. The structure elements indicated at 9 in FIG. 1 which are arranged on the base plane indicated at 12 in FIG. 5a are in the form of pyramids 25. If only two linear gratings cross at a right angle, the pyramids 25 have a square base surface in the base plane 12, as is shown in FIG. 6b as a plan view on to the relief structure 8. In FIG. 6b, the four side faces 10 of each pyramid as indicated at 25 in FIG. 6*a* are distinguished from each other by means of dot patterns of differing densities. The angle of inclination θ as shown in FIG. 1 in respect of the side faces 10 with respect to the base plane 12 is 45°.

Figure 7:
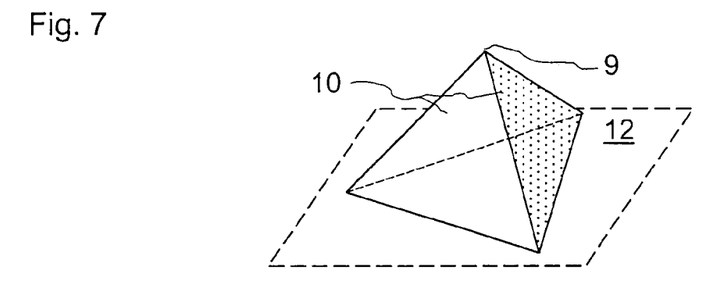
FIG. 7 shows a structure element with a tetrahedron structure.

Looking now at FIG. 7, shown therein is a structure element 9 of another embodiment of the relief structure indicated at 8 in for example FIG. 6*b*. The relief structure 8 is produced by the section of three linear gratings involving a symmetrical sawtooth profile. In this case the structure elements 9 are in the shape of a tetrahedron, the base surface of which is in the base plane 12. In the preferred configuration the grooves of the three gratings intersect at an angle of 60° so that the base surface of the tetrahedron forms an equilateral triangle. The angle of inclination θ as shown in FIG. 1 in respect of the side faces 10 with respect to the base plane 12 is 45°.

Further structure elements 9 are suitable for the relief structure 8, for example pyramids as indicated at 20 in FIG. 5*a*, the base surface of which is defined by a regular polygon.

It will be noted that the tips of the structure elements 9 which are illustrated in FIGS. 5 through 7 all face towards the surface indicated at 11 for example in FIG. 5*a*. The same effect is achieved by a negative configuration of the structure elements 9, in which case the tips thereof are on the base plane 12. As viewed from the surface 11 therefore, the structure elements 9 are then of a funnel-like configuration.

Figure 8:
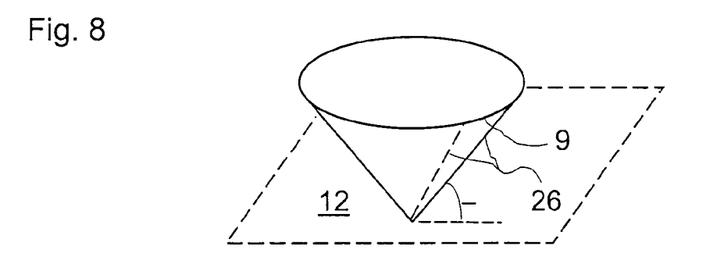
FIG. 8 shows a conical structure element.

Reference will now be made to FIG. 8 showing a special case in which the structure element 9 is in the form of a right circular cone with an opening angle of 90°, which is disposed standing with its tip on the base plane 12 in a perpendicular position. The side faces indicated at 10 in FIG. 7 of the structure element 9 are so-to-speak degenerated to form peripheral lines indicated at 26. In the case of a cone which is suitable for the retroreflector according to the invention, all lines 26 include an angle of inclination θ=45° with respect to the base plane 12.

Figure 9:
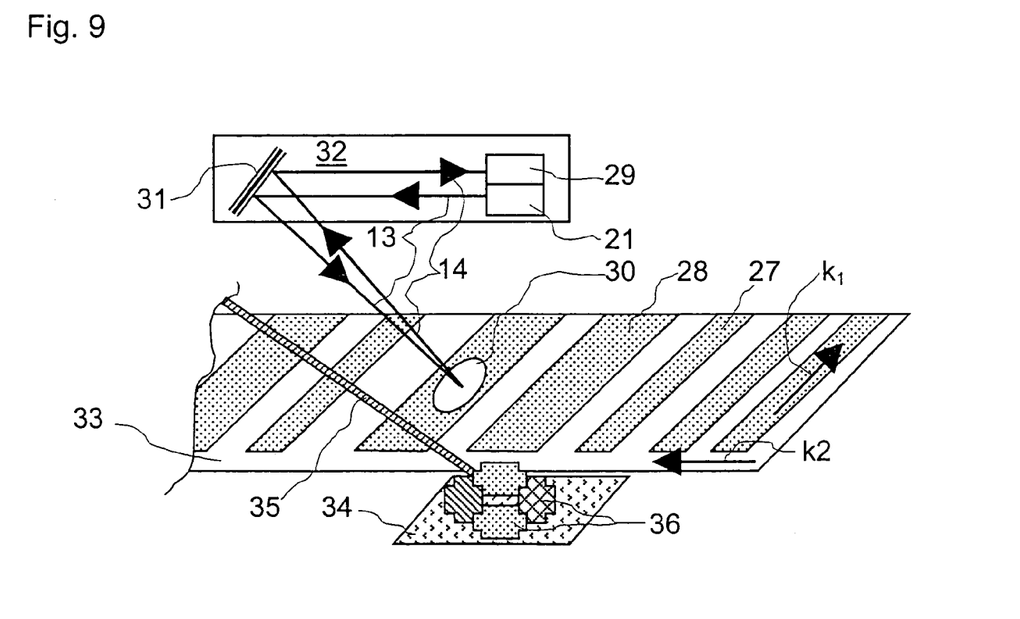
FIG. 9 shows an example of use of a retroreflector according to the invention.

FIG. 9 shows a possible configuration of a retroreflector in accordance with the invention in the form of a machine-readable, optically encoded marking which advantageously utilises polarisation of the microstructure indicated at 17 in FIG. 2. The retroreflector is divided into mutually juxtaposed surface portions or elements 27, 28. The microstructures 17, which are respectively superimposed on the relief structure indicated at 8 in FIG. 1, of the adjacent surface elements 27, 28 act as polarisers and differ only in respect of their preferred direction $k_1$ and $k_2$ respectively. Identification of the surface element 27, 28 which is irradiated with incident light as indicated at 13 is effected solely on the basis of the direction of polarisation of the reflected light beams 14. The reflected light beams 14 return to the light source 21 in almost parallel relationship with the incident light 13 and are received by a detector arrangement diagrammatically indicated at 29 arranged directly beside the light source 21. The detector arrangement 19 is designed to determine the direction of polarisation of the light beams 14, for example with polarisation filters arranged in front of the detector elements, as analysers.

The light source 21, with the incident light 13, produces a light spot 30 on the surface elements 27, 28. A deflection device 31, for example a rotating or tilting mirror, deflects the beam of the incident light 13 which, with the light spot 30, successively scans the surface elements 27, 28. As the reflected light beams 14 are oriented almost parallel to the incident light 13, the deflection device 31 projects the returning light beams 14 to the detector device 29.

The admissible reading distance will depend on the parallelism of the light 13 incident from the light source 21 in the beam, the light spot 30 of that light being of a dimension which corresponds at most to the smallest dimension of the surface elements 27, 28. The detector arrangement 29 is operable to detect at least at one moment the reflected light beams 14 when the light spot 30 is completely within one of the surface elements 27, 28.

The optically encoded marking of the retroreflector with the polarising microstructures 17 affords the advantage that the optical marking is machine-readable over a distance of some meters, typically up to around 10 meters, by a compact assembly 32 which comprises the light source 21, the detector arrangement 29 and the mirror of the deflection device 31, and polarisation of the reflected light beams 14 is recognised, against the background of the surroundings. In comparison therewith the known optically encoded markings can only be read from distances of at most some centimeters.

In an alternative configuration the machine-readable, optically encoded marking can be in the form of a bar code and can be disposed in the layer composite 2. The bar code has for example mutually parallel rectangular surface portions or elements 27, 28 as the bar elements, which are arranged at mutual spacings in a background field as indicated at 33 in FIG. 9. An item of information is encoded in bar elements of varying widths and in the spacing of the adjacent surface elements 27, 28. The relief structures 8, which are superimposed with the microstructure 17, of the surface elements 27, 28 and of the background field 33 differ in respect of the preferred directions $k_1$, $k_2$ of the microstructure 17, in which respect the preferred direction $k_1$ for the surface elements 27, 28 and the preferred direction $k_2$ in respect of the background field 33 include an azimuth angle in the range of between 30° and 90°. That bar code is machine-readable over a great distance, in particular with parallel coherent laser light.

The microstructure 17 which is superimposed on the relief structure 8 and which in turn is the periodic diffraction grating superimposed with one of the matt structures indicated at 18 in FIG. 3 is advantageously employed for use of the machine-readable, optically encoded marking. The matt structure 18 suppresses the diffraction effects at the relief structure 8 and determines the spatial angle of the reflected light beams 14 and the cross-section thereof.

It will be noted at this juncture that the surface elements 27, 28, the background field 33 and a field indicated at 34 with retroreflectors oriented in a predetermined fashion are also suitable for making up security patterns for optically variable security elements which are composed in a mosaic-like manner from surface portions 35, 36 occupied by diffractive gratings and which are in use on banknotes and other documents of all kinds. Diffractive security elements of that kind are described for example in EP-A 0 105 099, EP-A 0 375 833 and others, to which reference is hereby directed for incorporation thereof. The structures of the diffractive gratings, which are covered by the reflection layer indicated at 6 in FIG. 1, are formed in adjacent relationship with regions with the retroreflectors, in the parallel base plane indicated at 12 in FIG. 1, and enclosed between the layers indicated at 3 and 4 in FIG. 1 of the layer composite 2. The surface portions 35, 36 differ from the respectively adjacent surface regions in respect of at least one of their grating parameters such as spatial frequency, grating vector, grating profile and so forth. From the point of view of an observer (not shown), the surface elements 27, 28 occupied by retroreflectors, the background field 33 and the field 34 are only visible as a light surface when light is incident on the security element in approximately parallel relationship with the direction of view of the observer, while the surface portions 35, 36 with the diffractive gratings are dark. Conversely, under opposite lighting conditions, the surface portions 27, 28, 33, 34 with the retroreflectors remain dark while the surface portions 35, 36 are light, corresponding to the orientation of their grating vectors and their spatial frequency, when the security element is rotated in its own plane.

In an embodiment of the security pattern for example the surface portions 35, 36 are arranged on the field 34 serving as a background while in another embodiment the above-described optically encoded marking with the surface elements 27, 28 and optionally with the background field 33 is integrated into the security element, in which case the line-shaped surface portions 35 of a width of at most 0.2 mm may also extend over the surface elements 27, 28 and the background field 33. That combination has the advantage that the optically encoded marking is optimally adapted to machine reading, but it is visually not perceptible to an observer.

In a further configuration of the optical marking the background field 33, instead of the retroreflector, may also have a diffractive grating of the security element.

It will be appreciated that the above-described embodiments and configurations of the invention have been set forth solely by way of example and illustration of the principles thereof and that various other modifications and alterations may be made therein without thereby departing from the spirit and scope of the invention.

What is claimed is:

1. A retroreflector comprising a plastic layer composite including
   at least one transparent structure layer,
   a protective layer, and
   a reflection layer enclosed at a common interface between the structure layer and the protective layer, the reflection layer including a relief structure which is formed by substantially identically shaped three-dimensional structure elements having base surfaces of lateral dimensions in a range of between 1 $\mu$m and 200 $\mu$m and having side faces which are covered with the reflection layer, the side faces being at an angle of inclination of 45° relative to a free surface of the layer composite,
   wherein the layer composite has at least one surface element in which the relief structure is superimposed with a microstructure distinguished by a preferred direction and for influencing the quality of the reflection action of the layer composite, the microstructure in each surface element has a single preferred direction.

2. A retroreflector as set forth in claim 1
   wherein the structure layer has a side remote from the reflection layer,
   and including
   a base film of a transparent abrasion-resistant and tension-resistant plastic material, the base film being joined to said side of the structure layer that is remote from the reflection layer.

3. A retroreflector as set forth in claim 1
   wherein the structure elements are arranged non-periodically.

4. A retroreflector as set forth in claim 1
   wherein the reflection layer is metallic.

5. A retroreflector as set forth in claim 1
   wherein the microstructure is a linear diffraction grating with the preferred direction and has a grating period of shorter than 500 nm and an optically effective fine structure depth is of a value of a range of between 20 nm and 1000 nm.

6. A retroreflector as set forth in claim 5
   wherein for maximum polarisation efficiency of the diffraction grating the grating period is shorter than 350 nm and the fine structure depth is limited to a range of between 100 nm and 150 nm.

7. A retroreflector as set forth in claim 5
   wherein the reflection layer comprises a metal which is a good electrical conductor.

8. A retroreflector as set forth in claim 7
   wherein said metal is selected from a group consisting of silver, aluminum, gold and an alloy having one of said metals as a main component.

9. A retroreflector as set forth in claim 5 including
   a matt structure superimposed over the diffraction grating.

10. A retroreflector as set forth in claim 1
    wherein the microstructure is an anisotropic matt structure with the preferred direction.

11. A retroreflector as set forth in claim 8
    wherein said matt structure has a mean roughness value in a range of between 500 nm and 1000 nm and a correlation length of between 500 nm and 10,000 nm.

12. A retroreflector as set forth in claim 10
    wherein said matt structure has a mean roughness value in a range of between 500 nm and 1000 nm and a correlation length of between 500 nm and 10,000 nm.

13. A retroreflector as set forth in claim 1
    wherein said layer composite has a surface divided into said surface elements and into a background area, and
    the microstructures in the surface elements and in the background area differ only in respect of the azimuth value of the preferred directions.

14. A retroreflector as set forth in claim 13
    wherein the surface elements form on the background area a machine-readable optical marking in the form of a bar code, and
    wherein the surface elements have a first said preferred direction and the background area has a second said preferred direction, said first and second preferred directions differing by the azimuth value from a range of between 30° and 90°.

15. A retroreflector as set forth in claim 5
    wherein said layer composite has a surface divided into the surface elements of an image pattern,
    wherein the preferred directions of the matt structures used for the microstructure are identically oriented in the surface elements, and
    wherein the surface elements differ only in respect of the color of the transparent structure layer.

16. A retroreflector as set forth claim 5 including
    a transparent base film joined to a side of the structure layer, that is remote from the reflection layer,
    wherein said layer composite has a surface divided into the surface elements of an image pattern,
    wherein the preferred directions of the matt structures used for the microstructure are identically oriented in the surface elements, and
    wherein the surface elements differ only in respect of the color of the base film.

17. A retroreflector as set forth in claim 1
    wherein the layer composite has at least one surface part which is free from the relief structure and, wherein said surface part has an optically diffractive grating and is arranged in adjacent relationship with surface elements occupied by relief structures superimposed with microstructures.

18. A retroreflector as set forth in claim 17 wherein the gratings of adjacent surface parts differ in respect of at least one of the grating parameters.

19. A retroreflector as set forth in claim 17 wherein at least one surface part extends with a width in a range of between 0.02 and 0.2 mm over at least one group formed from the surface elements, the background field and a further field.

20. A retroreflector as set forth in claim 18 wherein at least one surface part extends with a width in a range of between 0.02 and 0.2 mm over at least one group formed from the surface elements, the background field and a further field.

21. A retroreflector as set forth in claim 1 wherein the protective layer has a surface remote from the structure layer and on said remote surface the protective layer has an adhesive layer for joining the layer composite to a substrate.

* * * * *